No. 651,083. Patented June 5, 1900.
J. A. McLAUGHLIN.
HUB FOR VEHICLES.
(Application filed May 6, 1899.)
(No Model.)
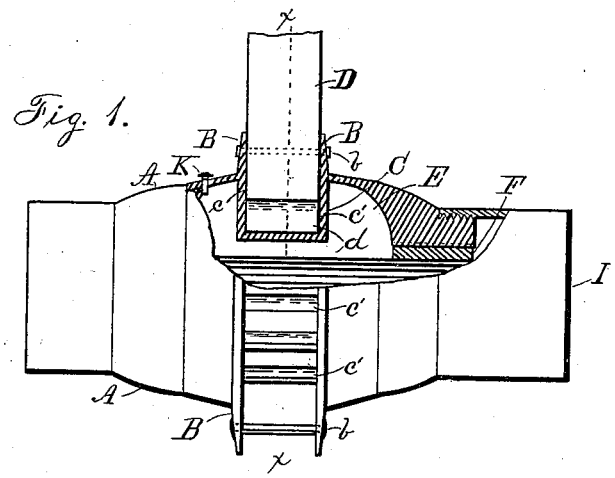
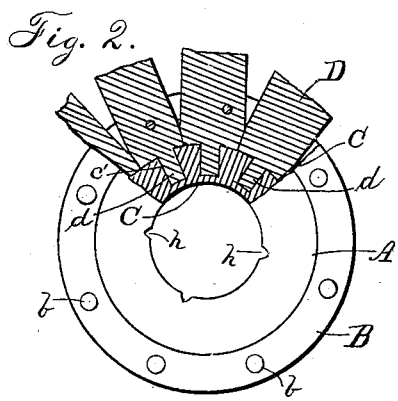
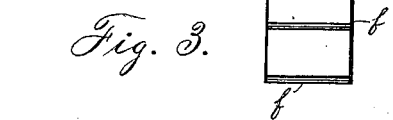
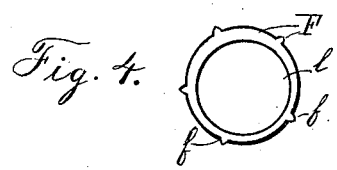
WITNESSES:
Otis D. Swett.
J. D. Gray.
INVENTOR
James A. McLaughlin.
BY
Chas. D. Swett
ATTORNEY

UNITED STATES PATENT OFFICE.

JAMES A. McLAUGHLIN, OF JESUP, GEORGIA.

HUB FOR VEHICLES.

SPECIFICATION forming part of Letters Patent No. 651,083, dated June 5, 1900.

Application filed May 6, 1899. Serial No. 715,809. (No model.)

*To all whom it may concern:*

Be it known that I, JAMES A. MCLAUGHLIN, a citizen of the United States, residing at Jesup, in the county of Wayne and State of Georgia, have invented certain new and useful Improvements in Hubs; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to metallic wheel-hubs and is applicable to wheels of all kinds, but especially to vehicle-wheels.

It consists in a novel construction of the hub itself and includes a bushing adapted to the hub which enables the wheelwright to accurately "true" or right the wheel with reference to the axle.

In the drawings, Figure 1 is a side view of a vehicle-hub, partly in section, and showing the bushing and axle in position. Fig. 2 is an end view of a hub with nose-band, axle, and bush removed and partly in section on line $x\ x$ of Fig. 1. Fig. 3 is a side, and Fig. 4 is an end, of the bushing.

The letter A indicates a hollow metallic hub cast in one piece and preferably of malleable iron. Its nose-band I is preferably made separate and adapted to be screwed upon the hub.

B B are vertical annular flanges formed centrally on the hub, and $b\ b$ are rivets to connect said flanges.

C is an inner annular rib or ridge formed centrally in the hub and having a deep central groove $c$, adapted to receive spokes D, and mortises $c'\ c'$ in the bottom of said groove to receive the tenons $d\ d$ of the spokes.

To secure lightness, a cavity E is molded in the hub, the bearings being at the solid terminal parts of the hub.

The sides and bottoms of the groove $c$ prevent the axle-oil from reaching the spokes and tenons and greatly strengthen the anchorage of the spokes.

F F are bushings fitted into each end of the hub as bearings on the axle. These bushings are provided with exterior longitudinal ribs $f\ f$, adapted to engage corresponding grooves $h\ h$ in the hub. The bore $l$ of these bushings is eccentric to their peripheral center, as shown in Fig. 4, by which means the wheel may be "trued" exactly on the axle, for if a finished wheel overleans on either side either one or both bushings are adjusted until the wheel is righted, which is readily done on account of the eccentricity of the bore.

The nose-band I is made detachable, so that when injured it can be removed and repaired or be replaced by another or be exchanged for an ornamental dust-guard or lubricating device adapted to screw upon the hub.

K indicates an oil-supply tube of ordinary construction, by means of which the axle may be lubricated through the hub-body.

What I claim, and desire to secure, is—

1. In a metallic vehicle-hub, longitudinal grooves in the ends of the hub, bushings with longitudinal ribs adapted to engage the grooves in the hub ends, and eccentric bores in said bushings substantially as and for the purpose specified.

2. A metallic hub in one piece, a detachable nose-band thereon, central, vertical, exterior, annular flanges, integral with the hub-body and connected by transverse rivets to each other, a central, annular ridge integral with and in the hub, an annular spoke-groove, and tenon-mortises in said ridge, longitudinal grooves in the hub ends, and annular eccentrically-bored bushings having exterior longitudinal ribs adapted to engage the grooves in the hub ends substantially as herein set forth.

In testimony whereof I affix my signature in presence of two witnesses.

JAMES A. McLAUGHLIN.

Witnesses:
D. L. GITT,
J. J. NELLIGAN.